United States Patent
Lu et al.

(10) Patent No.: US 10,241,340 B2
(45) Date of Patent: Mar. 26, 2019

(54) THREE-DIMENSIONAL DISPLAY DEVICE AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengcheng Lu, Beijing (CN); Ming Yang, Beijing (CN); Xiaochuan Chen, Beijing (CN); Wenqing Zhao, Beijing (CN); Lei Wang, Beijing (CN); Rui Xu, Beijing (CN); Jian Gao, Beijing (CN); Xiaochen Niu, Beijing (CN); Haisheng Wang, Beijing (CN); Changfeng Li, Beijing (CN); Bin Ma, Beijing (CN); Qian Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/526,318

(22) PCT Filed: Aug. 31, 2016

(86) PCT No.: PCT/CN2016/097552
§ 371 (c)(1),
(2) Date: May 11, 2017

(87) PCT Pub. No.: WO2017/118058
PCT Pub. Date: Jul. 13, 2017

(65) Prior Publication Data
US 2018/0059426 A1 Mar. 1, 2018

(30) Foreign Application Priority Data
Jan. 5, 2016 (CN) .......................... 2016 1 0006105

(51) Int. Cl.
G02B 27/22 (2018.01)
H04N 13/332 (2018.01)
(Continued)

(52) U.S. Cl.
CPC ......... *G02B 27/22* (2013.01); *G02B 27/2214* (2013.01); *G02B 27/2264* (2013.01);
(Continued)

(58) Field of Classification Search
CPC ...... G09G 3/2074; G09G 3/30; G09G 3/3208; G09G 3/3216; G09G 2300/0439;
(Continued)

(56) References Cited

U.S. PATENT DOCUMENTS

2004/0257495 A1* 12/2004 Hattori ............... H04N 13/0418
349/69
2006/0170833 A1* 8/2006 Lin .................... G02B 27/2214
349/15

(Continued)

FOREIGN PATENT DOCUMENTS

CN 1573435 A 2/2005
CN 1924639 A 3/2007
(Continued)

OTHER PUBLICATIONS

Office Action in Chinese Application No. 201610006105.7 dated Jun. 21, 2017, with English translation.
(Continued)

*Primary Examiner* — Angela K Davison
(74) *Attorney, Agent, or Firm* — Womble Bond Dickinson (US) LLP

(57) ABSTRACT

Embodiments of the present disclosure disclose a three-dimensional display device and a driving method thereof. In
(Continued)

---

S201: in one frame of display time, controlling a plurality of first sub-pixels in an electroluminescent display panel to form light emitting areas and black areas arranged alternately at least in a row direction, and at least every two second sub-pixels in a liquid crystal display panel correspond to one light emitting area, in a three-dimensional display mode, the second sub-pixels corresponding to a same light emitting area are used for displaying a left eye view and a right eye view respectively S202: in a next frame of display time adjacent to the one frame of display time, interchanging positions of the light emitting areas and the black areas in the electroluminescent display panel, and, controlling the second sub-pixel in the liquid crystal display panel for displaying the left eye view in the one frame of display time to display the right eye view in the next frame of display time and controlling the second sub-pixel in the liquid crystal display panel for displaying the right eye view in the one frame of display time to display the left eye view in the next frame of display time.

a previous frame of display time, one part of second sub-pixels in a liquid crystal display panel are controlled to display a left eye view, and the other part of second sub-pixels display a right eye view. In a next frame of display time, positions of light emitting areas and black areas in an electroluminescent display panel are interchanged, and the second sub-pixels that display the left eye view in the previous frame display the right eye view in the next frame, and the second sub-pixels that display the right eye view in the previous frame display the left eye view in the next frame. The sum of the previous frame and the next frame of display time is less than a predetermined maximum time.

18 Claims, 4 Drawing Sheets

(51) Int. Cl.
*G02F 1/1335* (2006.01)
*G09G 3/00* (2006.01)
*G09G 3/20* (2006.01)
*G09G 3/30* (2006.01)
*H04N 13/32* (2018.01)
*H04N 13/315* (2018.01)
*G09G 3/36* (2006.01)
*G09G 3/34* (2006.01)

(52) U.S. Cl.
CPC ....... *G02F 1/133621* (2013.01); *G09G 3/003* (2013.01); *G09G 3/2074* (2013.01); *G09G 3/30* (2013.01); *H04N 13/315* (2018.05); *H04N 13/32* (2018.05); *H04N 13/332* (2018.05); *G09G 3/3413* (2013.01); *G09G 3/36* (2013.01); *G09G 2300/023* (2013.01); *G09G 2300/0439* (2013.01)

(58) Field of Classification Search
CPC ................ H04N 13/312; H04N 13/315; H01L 27/3232; H01L 27/3234; G02B 27/2214; G02B 27/2228; G02B 27/225; G02B 27/2264
See application file for complete search history.

(56) References Cited

U.S. PATENT DOCUMENTS

| 2007/0047058 | A1 | 3/2007 | Lim |
| 2008/0259063 | A1* | 10/2008 | Kim ..................... H04N 13/354 345/204 |
| 2011/0234560 | A1* | 9/2011 | Shin ....................... G09G 3/003 345/208 |
| 2013/0093863 | A1 | 4/2013 | Hou et al. |
| 2013/0286303 | A1 | 10/2013 | Shibuya et al. |
| 2014/0146149 | A1 | 5/2014 | Wu |
| 2015/0156482 | A1 | 6/2015 | Sun et al. |
| 2016/0274370 | A1 | 9/2016 | Wu |

FOREIGN PATENT DOCUMENTS

| CN | 101101378 | A | 1/2008 |
| CN | 101290758 | A | 10/2008 |
| CN | 201514515 | U | 6/2010 |
| CN | 102201209 | A | 9/2011 |
| CN | 102510509 | A | 6/2012 |
| CN | 103018996 | A | 4/2013 |
| CN | 103221878 | A | 7/2013 |
| CN | 103278969 | A | 9/2013 |
| CN | 103424924 | A | 12/2013 |
| CN | 104581130 | A | 4/2015 |
| CN | 105319775 | A | 2/2016 |
| CN | 105425408 | A | 3/2016 |
| JP | H 09281440 | A | 10/1997 |
| JP | 2966762 | B2 | 10/1999 |

OTHER PUBLICATIONS

International Search Report and Written Opinion in PCT/CN2016/097552 dated Dec. 2, 2016, with English translation.

* cited by examiner

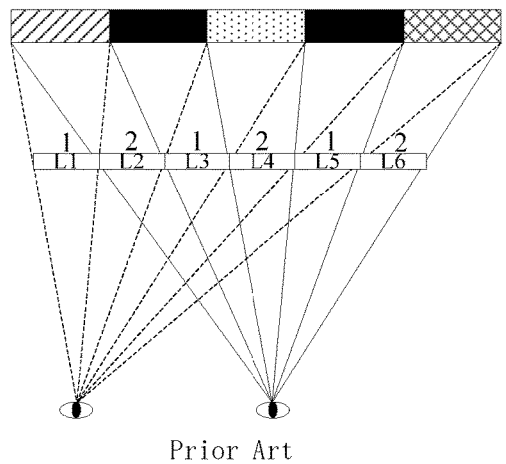

Prior Art

Fig. 1

| in one frame of display time, controlling a plurality of first sub-pixels in an electroluminescent display panel to form light emitting areas and black areas arranged alternately at least in a row direction, and at least every two second sub-pixels in a liquid crystal display panel correspond to one light emitting area, in a three-dimensional display mode, the second sub-pixels corresponding to a same light emitting area are used for displaying a left eye view and a right eye view respectively | S201 |

↓

| in a next frame of display time adjacent to the one frame of display time, interchanging positions of the light emitting areas and the black areas in the electroluminescent display panel, and, controlling the second sub-pixel in the liquid crystal display panel for displaying the left eye view in the one frame of display time to display the right eye view in the next frame of display time and controlling the second sub-pixel in the liquid crystal display panel for displaying the right eye view in the one frame of display time to display the left eye view in the next frame of display time. | S202 |

Fig. 2

THREE-DIMENSIONAL DISPLAY DEVICE AND DRIVING METHOD THEREOF

RELATED APPLICATIONS

The present application is the U.S. national phase entry of PCT/CN2016/097552, with an international filing date of Aug. 31, 2016, which claims the benefit of Chinese Patent Application No. 201610006105.7, filed Jan. 5, 2016, the entire disclosures of which are incorporated herein by reference.

TECHNICAL FIELD

The present disclosure relates to the field of display technology, particularly to a three-dimensional display device and a driving method thereof.

BACKGROUND

The main principle of three-dimensional (3D) display technology is enabling the left eye and the right eye of a viewer to receive images with slight difference respectively, i.e., left view and right view. The two views are analyzed and integrated by a brain so as to enable the viewer to perceive the depth of an image object, thereby producing stereo perception.

The early 3D display device requires a user to wear corresponding 3D glasses. In recent years, a naked eye 3D display device has attracted much attention. There are generally two types of devices for achieving naked eye 3D display: slit grating type 3D display device and micro lens array type 3D display device. The slit grating is also called parallax barrier, which is generally implemented using a switch liquid crystal screen, a high molecule liquid crystal layer and a polarizing film. By controlling the voltage difference between electrodes of upper and lower substrates in the switch liquid crystal screen, the liquid crystals in the high molecule liquid crystal layer are rotated, so as to form opaque strips, i.e., parallax barrier. When the switch of the liquid crystal screen is turned on, under the effect of the parallax barrier, the left eye view can only be seen by the left eye, while the right eye is blocked. The right eye view can only be seen by the right eye, while the left eye is blocked. When the switch of the liquid crystal screen is turned off, the display panel will not generate parallax barrier, thereby becoming an ordinary 2D display.

For example, in a three-dimensional display mode, the rear grating as shown in FIG. 1 forms a light emitting area and a black area. The pixels in the front liquid crystal display panel corresponding to a same light emitting area display different gray scale information, so as to enable images with different gray scale information to be received by two adjacent viewpoints. When the left and right eyes of a person are located at the two viewpoints respectively, two different images will be received, and then converged into the brain by vision of two eyes to become one image, thereby generating stereovision so as to realize naked eye 3D display. In FIG. 1, the case of realizing two viewpoints is shown by taking the example that one light emitting area corresponds to two pixels. Different gray scales are distinguished with "1" and "2". It can be seen that the left eye can only receive the views of pixels L1, L3 and L5 with a gray scale of "1" through the rear grating, and the right eye can only receive the views of pixels L2, L4 and L6 with a gray scale of "2" through the rear grating. Hence, the left and right eyes of a person can only see half information of the display image in the liquid crystal display panel respectively, which results in a relatively low resolution and pixels per inch (PPI) of the 3D display.

SUMMARY

Therefore, it is desired to mitigate or avoid the problem of a relatively low PPI and resolution of 3D display.

According to an aspect, an embodiment of the present disclosure provides a driving method of a three-dimensional display device. The three-dimensional display device comprises a liquid crystal display panel and an electroluminescent display panel arranged under the liquid crystal display panel. The electroluminescent display panel comprises a plurality of first sub-pixels arranged in array, and the liquid crystal display panel comprises a plurality of second sub-pixels arranged in array. The driving method comprises: in one frame of display time, controlling the plurality of first sub-pixels in the electroluminescent display panel to form light emitting areas and black areas arranged alternately at least in a row direction, and wherein, at least every two second sub-pixels in the liquid crystal display panel correspond to one light emitting area, in a three-dimensional display mode, the second sub-pixels corresponding to a same light emitting area are used for displaying a left eye view and a right eye view respectively; and, in a next frame of display time adjacent to said one frame of display time, interchanging positions of the light emitting areas and the black areas in the electroluminescent display panel, and, controlling the second sub-pixel in the liquid crystal display panel for displaying the left eye view in said one frame of display time to display the right eye view in said next frame of display time and controlling the second sub-pixel in the liquid crystal display panel for displaying the right eye view in said one frame of display time to display the left eye view in said next frame of display time. In the three-dimensional display mode, the second sub-pixel for displaying the left eye view and the second sub-pixel for displaying the right eye view that correspond to the same light emitting area display different gray scale information. And a sum of said one frame of display time and said next frame of display time is not greater than a predetermined maximum time.

In a possible implementation, in a two-dimensional display mode, the second sub-pixel for displaying the left eye view and the second sub-pixel for displaying the right eye view that correspond to the same light emitting area are controlled to display the same gray scale information.

In a possible implementation, the sum of said one frame of display time and said next frame of display time is 1/60 s.

In a possible implementation, the light emitting areas and the black areas arranged alternately at least in the row direction formed by the plurality of first sub-pixels in the electroluminescent display panel are controlled to be also arranged alternately in a column direction.

In a possible implementation, light emitting colors of first sub-pixels of a same row in the electroluminescent display panel are the same and said light emitting colors are different from light emitting colors of first sub-pixels of an adjacent row. And, controlling the plurality of first sub-pixels in the electroluminescent display panel to form light emitting areas and black areas arranged alternately in the row direction and in the column direction comprises: controlling first sub-pixels in a same row and first sub-pixels in a same column in the electroluminescent display panel to emit light alternately, so as to form light emitting areas and black areas arranged alternately in the row direction and in the column direction.

In a possible implementation, the light emitting areas and the black areas formed by the plurality of first sub-pixels in the electroluminescent display panel are in strip shapes in a column direction.

In a possible implementation, in the electroluminescent display panel, first sub-pixels of every two adjacent columns constitute a pixel group, light emitting colors of first sub-pixels in a same pixel group are the same and said light emitting colors are different from light emitting colors of first sub-pixels in an adjacent pixel group. And, controlling the plurality of first sub-pixels in the electroluminescent display panel to form light emitting areas and black areas that are arranged alternately in the row direction and in strip shapes in the column direction comprises: controlling a plurality of columns of first sub-pixels in the electroluminescent display panel to emit light alternately, so as to form light emitting areas and black areas that are arranged alternately in the row direction and in strip shapes in the column direction.

According to another aspect, an embodiment of the present disclosure further provides a three-dimensional display device, comprising: a liquid crystal display panel and an electroluminescent display panel arranged under the liquid crystal display panel. The electroluminescent display panel comprises a plurality of first sub-pixels arranged in array, in one frame of display time, the plurality of first sub-pixels in the electroluminescent display panel form light emitting areas and black areas arranged alternately at least in a row direction, and, in a next frame of display time adjacent to said one frame of display time, positions of the light emitting areas and the black areas in the electroluminescent display panel are interchanged. The liquid crystal display panel comprises a plurality of second sub-pixels arranged in array, in said one frame of display time, at least every two second sub-pixels in the liquid crystal display panel correspond to one light emitting area, in a three-dimensional display mode, second sub-pixels corresponding to a same light emitting area are used for displaying a left eye view and a right eye view respectively, and, in the next frame of display time adjacent to said one frame of display time, the second sub-pixel in the liquid crystal display panel for displaying the left eye view in said one frame of display time is used for displaying the right eye view in said next frame of display time, and the second sub-pixel in the liquid crystal display panel for displaying the right eye view in said one frame of display time is used for displaying the left eye view in said next frame of display time. In the three-dimensional display mode, the second sub-pixel for displaying the left eye view and the second sub-pixel for display the right eye view that correspond to the same light emitting area display different gray scale information. And, a sum of said one frame of display time and said next frame of display time is not greater than a predetermined maximum time.

In a possible implementation, light emitting colors of first sub-pixels of a same row in the electroluminescent display panel are the same and said light emitting colors are different from light emitting colors of first sub-pixels of an adjacent row, and the second sub-pixels of the liquid crystal display panel do not include a color filter.

In a possible implementation, in the electroluminescent display panel, first sub-pixels of every two adjacent columns constitute a pixel group, light emitting colors of first sub-pixels in a same pixel group are the same and said light emitting colors are different from light emitting colors of first sub-pixels in an adjacent pixel group, and the second sub-pixels of the liquid crystal display panel do not include a color filter.

In a possible implementation, each first sub-pixel in the electroluminescent display panel comprises a passive matrix organic light emitting diode (PMOLED).

In a possible implementation, an aspect ratio of each first sub-pixel is 1:1 or 1:2.

In a possible implementation, in a two-dimensional display mode, the second sub-pixel for displaying the left eye view and the second sub-pixel for displaying the right eye view that correspond to the same light emitting area display the same gray scale information.

BRIEF DESCRIPTION OF THE DRAWINGS

FIG. 1 is a schematic view of principle of known three-dimensional display;

FIG. 2 is a flow chart of a driving method of a three-dimensional display device provided by an embodiment of the present disclosure;

DETAILED DESCRIPTION OF THE DISCLOSURE

Figure 3:
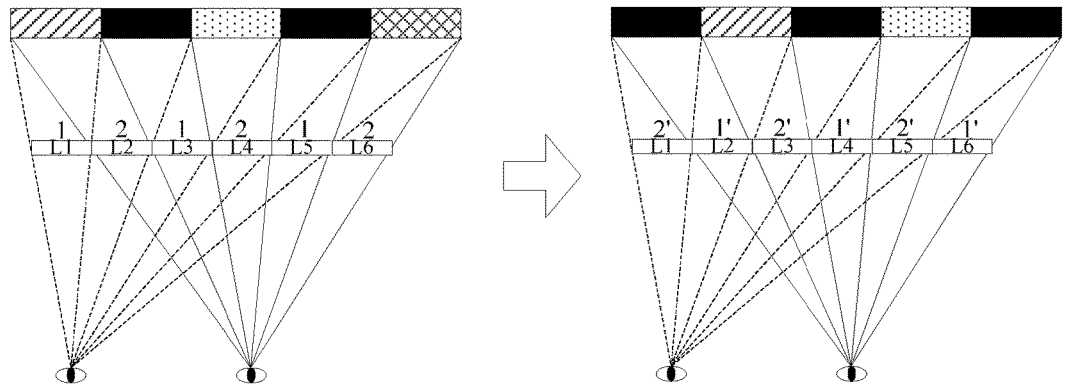
FIG. 3 is a schematic view when the driving method of a three-dimensional display device provided by an embodiment of the present disclosure performs 3D display.

Next, specific implementations of a three-dimensional display device and a driving method thereof provided by embodiments of the present disclosure will be explained in detail with reference to the drawings.

An embodiment of the present disclosure provides a driving method of a three-dimensional display device. The three-dimensional display device comprises a liquid crystal display panel and an electroluminescent display panel arranged under the liquid crystal display panel. The electroluminescent display panel comprises a plurality of first sub-pixels arranged in array, and the liquid crystal display panel comprises a plurality of second sub-pixels arranged in array. As shown in FIG. 2, the driving method of the three-dimensional display device comprises:

S201, in one frame of display time, controlling the plurality of first sub-pixels in the electroluminescent display panel to form light emitting areas and black areas arranged alternately at least in a row direction. And at least every two second sub-pixels in the liquid crystal display panel correspond to one light emitting area. In a three-dimensional display mode, the second sub-pixels corresponding to a same light emitting area are used for displaying a left eye view and a right eye view respectively.

S202, in a next frame of display time adjacent to the one frame of display time, interchanging positions of the light emitting areas and the black areas in the electroluminescent display panel, and, controlling the second sub-pixel in the liquid crystal display panel for displaying the left eye view in the one frame of display time to display the right eye view in the next frame of display time and controlling the second sub-pixel in the liquid crystal display panel for displaying the right eye view in the one frame of display time to display the left eye view in the next frame of display time.

In the three-dimensional display mode, the second sub-pixel for displaying the left eye view and the second sub-pixel for displaying the right eye view that correspond to the same light emitting area display different gray scale information. And a sum of the one frame of display time and the next frame of display time is not greater than a maximum time during which human eyes can't distinguish between the one frame and the next frame.

In the above driving method of a three-dimensional display device provided by an embodiment of the present disclosure, a sum of every two adjacent frames of display time is not greater than a maximum time during which the human eyes can't distinguish between the one frame and the next frame. In a previous frame of display time, one part of the second sub-pixels in the liquid crystal display panel are controlled to display the left eye view, and the other part of the second sub-pixels display the right eye view. Due to blocking of a plurality of black areas in the electroluminescent display panel that are arranged at intervals with a plurality of light emitting areas at least in the row direction, the left eye of a person can only see half information of the display view in the liquid crystal display panel, and the right eye of the person can only see the other half information of the display view in the liquid crystal display panel. In a next frame of display time, the positions of the light emitting areas and the black areas in the electroluminescent display panel are controlled to be interchanged, and the left eye view and the right eye view displayed by the second sub-pixels of the two parts in the liquid crystal display panel are controlled to be switched. The second sub-pixels that display the left eye view in the previous frame display the right eye view in the next frame, and the second sub-pixels that display the right eye view in the previous frame display the left eye view in the next frame, thereby under blocking of the plurality of black areas at new positions in the electroluminescent display panel, the left eye of the person sees half information of the display view at a position different from the previous position in the liquid crystal display panel, and the right eye of the person sees the other half information of the display view at a position different from the previous position in the liquid crystal display panel. Since the sum of the previous frame and the next frame of display time is less than a maximum time during which the human eyes can't distinguish between the one frame and the next frame, the viewer can perceive an image with all information via analysis and integration by the brain, thereby increasing the resolution and the PPI of 3D display.

In the above driving method provided by an embodiment of the present disclosure, an electroluminescent display panel arranged under the liquid crystal display panel is used to replace the conventional backlight, so as to enable the whole three-dimensional display device to be thin and light. Light emitting areas and black areas arranged alternately are formed in the electroluminescent display panel so as to form a grating structure, thereby enabling the electroluminescent display panel to further have the function of rear three-dimensional grating in addition to providing backlight of the liquid crystal display panel. Thus, an additional three-dimensional grating in front of the liquid crystal display panel is omitted, which is benefit for a thin and light design of the whole three-dimensional display device and is benefit for the front liquid crystal display panel to add functions such as a touch function. Moreover, since brightness of the electroluminescent display panel is approximately zero in a black state, the black and white states have a relatively high contrast. Hence, the formed three-dimensional grating can easily achieve three-dimensional display of low crosstalk.

Further, in the above driving method provided by an embodiment of the present disclosure, in each frame of display time, black areas formed by first sub-pixels that do not emit light exist in the electroluminescent display panel. Hence, display power consumption can be saved.

For example, a refresh frequency of 120 Hz can be used for display, i.e., each frame of display time is $\frac{1}{120}$ s. Thus, every two adjacent frames of display time is $\frac{1}{60}$ s. Because the human eyes cannot distinguish the image displayed within $\frac{1}{60}$ s, what is presented in the human brain is all information viewed within $\frac{1}{60}$ s. Certainly, in specific implementation, the refresh frequency for display can also be increased higher, e.g., 180 Hz, 240 Hz etc. Then, when the driving method provided by an embodiment of the present disclosure performs display, the display resolution and PPI will be higher. However, power consumption of the three-dimensional display device will also be increased accordingly.

Specifically, as shown in FIG. 3, in the three-dimensional display mode, for example, one light emitting area corresponds to two second sub-pixels. For example, as shown in the left figure of FIG. 3, the second sub-pixels L1 and L2 correspond to one light emitting area, the second sub-pixels L3 and L4 correspond to one light emitting area, and the second sub-pixels L5 and L6 correspond to one light emitting area. In specific implementation, one light emitting area can correspond to a plurality of second sub-pixels, e.g., four, six, etc.

In a previous frame of display time, as shown in the left figure of FIG. 3, the light emitting areas formed in the electroluminescent display panel are located at odd positions, and the black areas formed in the electroluminescent display panel are located at even positions. In the liquid crystal display panel, two second sub-pixels corresponding to each light emitting area are controlled to display gray scale information of different views. For example, the second sub-pixels L1, L3, L5 are used for displaying the left eye view, and the second sub-pixels L2, L4, L6 are used for displaying the right eye view. The second sub-pixel for displaying the left eye view and the second sub-pixel for displaying the right eye view that correspond to the same light emitting area display different gray scale information. In the left figure of FIG. 3, different gray scales are distinguished with "1" and "2". The second sub-pixels L1 and L2 are controlled to display different gray scale information, the second sub-pixels L3 and L4 are controlled to display different gray scale information, and the second sub-pixels L5 and L6 are controlled to display different gray scale information. Here, the left eye sees the information of the second sub-pixels L1, L3, L5, and the right eye sees the information of the second sub-pixels L2, L4, L6. That is, the left eye of a person can only see half information of the display view in the liquid crystal display panel, and the right eye of the person can only see the other half information of the display view in the liquid crystal display panel.

In a next frame of display time, as shown in the right figure of FIG. 3, the light emitting areas formed in the electroluminescent display panel are located at even positions, and the black areas formed in the electroluminescent display panel are located at odd positions. In the liquid crystal display panel, two second sub-pixels corresponding to each light emitting area are controlled to display gray scale information of different views. For example, the second sub-pixels L2, L4, L6 are used for displaying the left eye view, and the second sub-pixels L1, L3, L5 are used for displaying the right eye view. The second sub-pixel for displaying the left eye view and the second sub-pixel for displaying the right eye view that correspond to the same light emitting area display different gray scale information. In the right figure of FIG. 3, different gray scales are distinguished with "1'" and "2'". The second sub-pixels L1 and L2 are controlled to display different gray scale information, the second sub-pixels L3 and L4 are controlled to display different gray scale information, and the second sub-pixels L5 and L6 are controlled to display different gray scale information. Here, the second sub-pixels seen by the left and right eyes are exactly contrary to those in the previous frame. The left eye sees the information of the second sub-pixels L2, L4, L6, and the right eye sees the information of the second sub-pixels L1, L3, L5. That is, the left eye of a person can only see half information of the display view at a position different from the previous position in the liquid crystal display panel, and the right eye of the person can only see the other half information of the display view at a position different from the previous position in the liquid crystal display panel.

Because in each frame of display time of two adjacent frames of display time, each of the left and right eyes see half three-dimensional view information of a three-dimensional image, and in two adjacent frames of display time, each of the left and right eyes see different three-dimensional information, hence, within a normal refresh frequency for example 60 Hz, the human eyes can see a three-dimensional image of full resolution.

In the driving method provided by an embodiment of the present disclosure, two-dimensional display of full resolution can be realized by controlling the second sub-pixel for displaying the left eye view and the second sub-pixel for displaying the right eye view that correspond to a same light emitting area to display the same gray scale information in a two-dimensional display mode.

Figure 4:
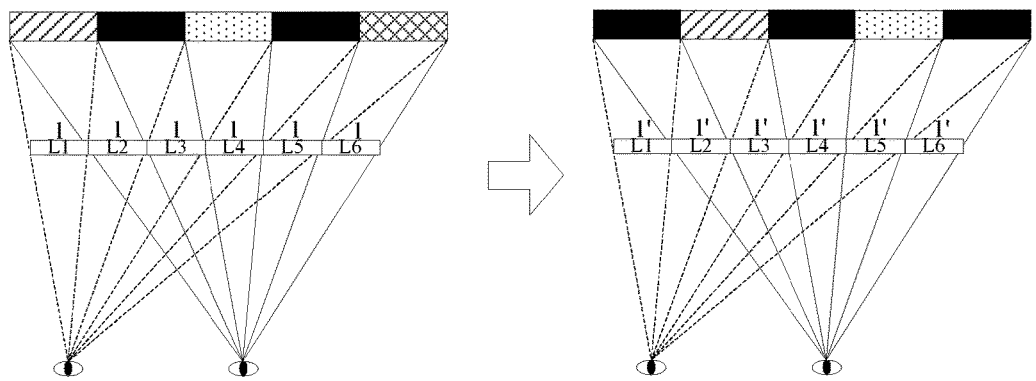
FIG. 4 is a schematic view when the driving method of a three-dimensional display device provided by an embodiment of the present disclosure performs 2D display.

Specifically, as shown in FIG. 4, in a two-dimensional display mode, for example, one light emitting area corresponds to two second sub-pixels. In specific implementation, one light emitting area can correspond to a plurality of second sub-pixels, e.g., four, six, etc.

In a previous frame of display time, as shown in the left figure of FIG. 4, the light emitting areas formed in the electroluminescent display panel are located at odd positions, and the black areas formed in the electroluminescent display panel are located at even positions. In the liquid crystal display panel, two second sub-pixels corresponding to each light emitting area are controlled to display same gray scale information of different views. For example, the second sub-pixels L1, L3, L5 are used for displaying the left eye view, and the second sub-pixels L2, L4, L6 are used for displaying the right eye view. The second sub-pixel for displaying the left eye view and the second sub-pixel for displaying the right eye view that correspond to the same light emitting area display same gray scale information. In the left figure of FIG. 4, the same gray scale is represented with "1". The second sub-pixels L1 and L2 are controlled to display the same gray scale information, the second sub-pixels L3 and L4 are controlled to display the same gray scale information, and the second sub-pixels L5 and L6 are controlled to display the same gray scale information. Here, the left eye sees the information of the second sub-pixels L1, L3, L5, and the right eye sees the information of the second sub-pixels L2, L4, L6. That is, the left eye of a person can only see half information of the display view in the liquid crystal display panel, and the right eye of the person can only see the other half information of the display view in the liquid crystal display panel.

In a next frame of display time, as shown in the right figure of FIG. 4, the light emitting areas formed in the electroluminescent display panel are located at even positions, and the black areas formed in the electroluminescent display panel are located at odd positions. In the liquid crystal display panel, two second sub-pixels corresponding to each light emitting area are controlled to display same gray scale information of different views. For example, the second sub-pixels L2, L4, L6 are used for displaying the left eye view, and the second sub-pixels L1, L3, L5 are used for displaying the right eye view. The second sub-pixel for displaying the left eye view and the second sub-pixel for displaying the right eye view that correspond to the same light emitting area display the same gray scale information. In the right figure of FIG. 4, the same gray scale is presented with "1'". The second sub-pixels L1 and L2 are controlled to display the same gray scale information, the second sub-pixels L3 and L4 are controlled to display the same gray scale information, and the second sub-pixels L5 and L6 are controlled to display the same gray scale information. Here, the second sub-pixels seen by the left and right eyes are exactly contrary to those in the previous frame. The left eye sees the information of the second sub-pixels L2, L4, L6, and the right eye sees the information of the second sub-pixels L1, L3, L5. That is, the left eye of a person can only see half information of the display view at a position different from the previous position in the liquid crystal display panel, and the right eye of the person can only see the other half information of the display view at a position different from the previous position in the liquid crystal display panel.

For example, in each frame of display time, the light emitting areas and the black areas formed in the electroluminescent display panel can be arranged in the following two ways.

1. In a Chinese character "吕" shaped arrangement. Specifically, the light emitting areas and the black areas arranged alternately in the row direction formed by the plurality of first sub-pixels in the electroluminescent display panel can be controlled to be also arranged alternately in a column direction.

Figure 5:
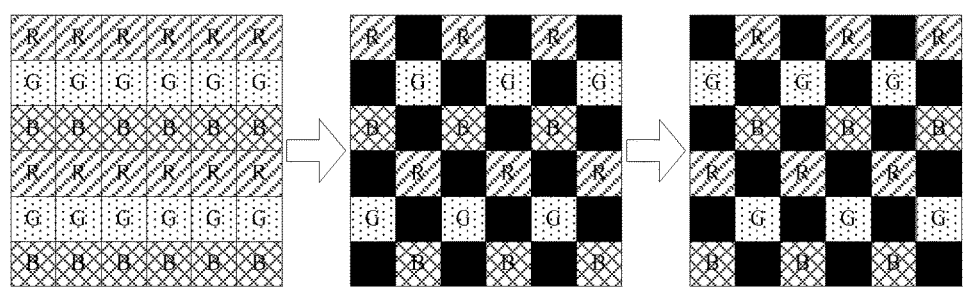
FIG. 5 is a schematic view of arrangement of a plurality of light emitting areas of an electroluminescent display panel in a three-dimensional display device provided by an embodiment of the present disclosure.

Then, as shown in the left figure of FIG. 5, the structure of the first sub-pixels in the electroluminescent display panel can be: light emitting colors of first sub-pixels of a same row are the same and the light emitting colors are different from light emitting colors of first sub-pixels of an adjacent row. In FIG. 5, explanation is made by taking the example that the electroluminescent display panel comprises a plurality of first sub-pixels with the light emitting colors of R, G, and B.

Correspondingly, controlling the plurality of first sub-pixels in the electroluminescent display panel to form light emitting areas and black areas arranged alternately in the row direction and in the column direction can be implemented by the following way: controlling first sub-pixels in a same row and first sub-pixels in a same column in the electroluminescent display panel to emit light alternately, so as to form light emitting areas and black areas arranged alternately in the row direction and in the column direction.

For example, in a previous frame of display time, as shown in the middle figure of FIG. 5, the first sub-pixels at odd positions in the first, third, and fifth rows are controlled to form light emitting areas, and the first sub-pixels at even positions are controlled to form black areas. Moreover, the first sub-pixels at even positions in the second, fourth, and sixth rows are controlled to form light emitting areas, and the first sub-pixels at odd positions are controlled to form black areas. In a next frame of display time, as shown in the right figure of FIG. 5, the first sub-pixels that form light emitting areas in the previous frame are controlled to form black areas in the next frame, and the first sub-pixels that form black areas in the previous frame are controlled to form light emitting area in the next frame.

2. In a strip arrangement. Specifically, the light emitting areas and the black areas formed by the plurality of first sub-pixels in the electroluminescent display panel can be controlled to be in strip shape in the column direction.

Figure 6:
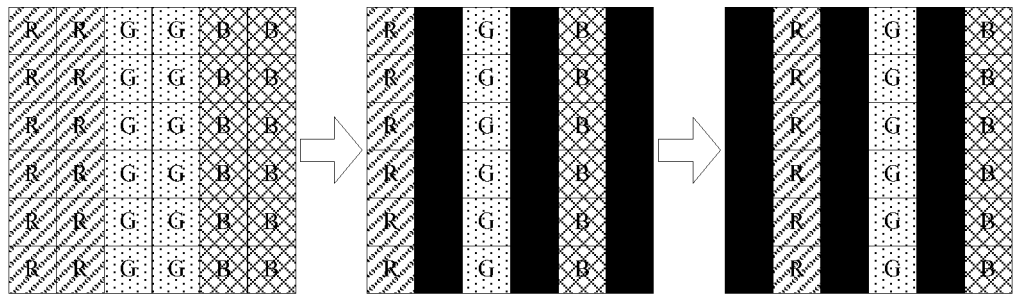
FIG. 6 is another schematic view of arrangement of a plurality of light emitting areas of an electroluminescent display panel in a three-dimensional display device provided by an embodiment of the present disclosure.

Then, as shown in the left figure of FIG. 6, the structure of the first sub-pixels in the electroluminescent display panel can be: first sub-pixels of every two adjacent columns constitute a pixel group, light emitting colors of first sub-pixels in a same pixel group are the same and the light emitting colors are different from light emitting colors of first sub-pixels in an adjacent pixel group. In FIG. 6, explanation is made by taking the example that the electroluminescent display panel comprises a plurality of first sub-pixels with the light emitting colors of R, G, and B.

Correspondingly, controlling the plurality of first sub-pixels in the electroluminescent display panel to form light emitting areas and black areas that are arranged alternately in the row direction and in strip shapes in the column direction can be implemented by the following way: controlling a plurality of columns of first sub-pixels in the electroluminescent display panel to emit light alternately, so as to form light emitting areas and black areas that are arranged alternately in the row direction and in strip shapes in the column direction.

For example, in a previous frame of display time, as shown in the middle figure of FIG. 6, the first sub-pixels of odd columns are controlled to form light emitting areas, and the first sub-pixels of even columns are controlled to form black areas. In a next frame of display time, as shown in the right figure of FIG. 6, the first sub-pixels that form light emitting areas in the previous frame are controlled to form black areas in the next frame, and the first sub-pixels that form black areas in the previous frame are controlled to form light emitting areas in the next frame. That is, the first sub-pixels of even columns are controlled to form light emitting area, and the first sub-pixels of odd columns are controlled to form black areas.

Figure 7:
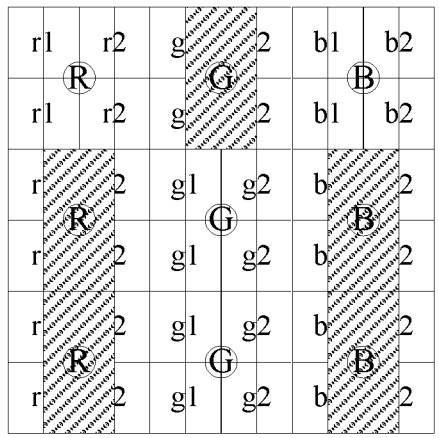
FIG. 7 to FIG. 9 are schematic views of light emitting areas and corresponding first sub-pixels in a three-dimensional display device provided by an embodiment of the present disclosure respectively.
Figure 8:
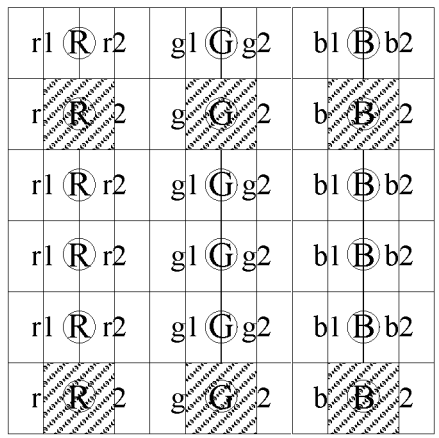
Figures 9, 10:
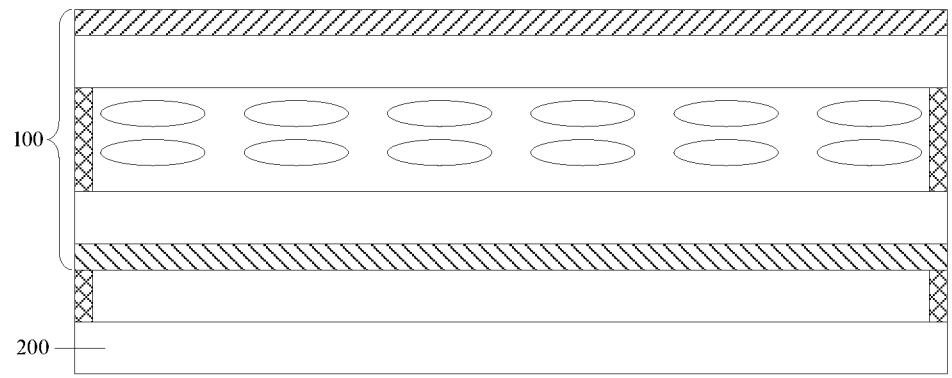
FIG. 10 is a structural schematic view of a three-dimensional display device provided by an embodiment of the present disclosure.

In the above two arrangements of the light emitting areas and the black areas formed in the electroluminescent display panel, the number of the second sub-pixels in the liquid crystal display panel corresponding to each light emitting area can be changed based on the aspect ratio of the first sub-pixels that form each light emitting area. For example, the light emitting areas are in a strip arrangement. When the aspect ratio of the first sub-pixel is 1:2, as shown in FIG. 7, one light emitting area can correspond to four second sub-pixels. Moreover, as shown in FIG. 7, a center position of the light emitting area is at a center position of an area where the four second sub-pixels locate, indicated by a circle in FIG. 7. When two-dimensional display is performed, the four second sub-pixels display the same gray scale information. When three-dimensional display is performed, two second sub-pixels display gray scale information, and the other two second sub-pixels display other gray scale information. When the aspect ratio of the first sub-pixel is 1:1, as shown in FIG. 8, one light emitting area can correspond to two second sub-pixels. As shown in FIG. 8, a center position of the light emitting area is at a center position of an area where the two second sub-pixels locate, indicated by a circle in FIG. 8. When two-dimensional display is performed, the two second sub-pixels display the same gray scale information. When three-dimensional display is performed, one second sub-pixel displays gray scale information, and the other second sub-pixel displays other gray scale information. When the first sub-pixel is in a strip shape, as shown in FIG. 9, one light emitting area can correspond to two columns of second sub-pixels. As shown in FIG. 9, the center position of the light emitting area is at the center position of the area where the two columns of second sub-pixels locate. When two-dimensional display is performed, the two columns of second sub-pixels display the same gray scale information. When three-dimensional display is performed, one column of second sub-pixels display gray scale information, and the other column of second sub-pixels display other gray scale information.

Based on the same inventive concept, an embodiment of the present disclosure further provides a three-dimensional display device. The display device can be any product or component with the display function such as a mobile phone, a tablet computer, a television, a display, a laptop, a digital photo frame, a navigator etc. Because the principle of the device for solving problems is similar as the preceding driving method, the implementation of the device can make reference to the implementation of the method, which will not be repeated here.

Specifically, an embodiment of the present disclosure provides a three-dimensional display device. As shown in FIG. 10, the three-dimensional display device comprises: a liquid crystal display panel 100, and an electroluminescent display panel 200 arranged under the liquid crystal display panel 100.

The electroluminescent display panel 200 comprises a plurality of first sub-pixels arranged in array. In one frame of display time, the plurality of first sub-pixels in the electroluminescent display panel form light emitting areas and black areas arranged alternately at least in a row direction. And, in a next frame of display time adjacent to the one frame of display time, positions of the light emitting areas and the black areas in the electroluminescent display panel are interchanged.

The liquid crystal display panel 100 comprises a plurality of second sub-pixels arranged in array. In the one frame of display time, at least every two second sub-pixels in the liquid crystal display panel correspond to one light emitting area. In a three-dimensional display mode, second sub-pixels corresponding to a same light emitting area are used for displaying a left eye view and a right eye view respectively. And, in the next frame of display time adjacent to the one frame of display time, the second sub-pixel in the liquid crystal display panel for displaying the left eye view in the one frame of display time is used for displaying the right eye view in the next frame of display time, and the second sub-pixel in the liquid crystal display panel for displaying the right eye view in the one frame of display time is used for displaying the left eye view in the next frame of display time.

In the three-dimensional display mode, the second sub-pixel for displaying the left eye view and the second sub-pixel for display the right eye view that correspond to the same light emitting area display different gray scale information. And, a sum of the one frame of display time and the next frame of display time is not greater than a maximum time during which the human eyes can't distinguish between the one frame and the next frame.

Further, when the above three-dimensional display device provided by an embodiment of the present disclosure needs to perform two-dimensional image display, i.e., in the two-dimensional display mode, the second sub-pixels for displaying the left eye view and the second sub-pixels for displaying the right eye view that correspond to the same light emitting area display the same gray scale information. Thus, the left and right eyes of a person can see two views of the same, thereby realizing two-dimensional display.

Further, for example, as shown in FIG. 5, light emitting colors of first sub-pixels of a same row in the electroluminescent display panel 200 are the same and the light emitting colors are different from light emitting colors of first sub-pixels of an adjacent row. The second sub-pixels of the liquid crystal display panel do not include a color filter. Then, light emitting areas and black areas arranged alternately in both the row direction and the column direction can be formed in the electroluminescent display panel in each frame of display time. This enables distribution of the light emitting areas and the black areas in the electroluminescent display panel to be relatively uniform, which is benefit for enabling brightness distribution of the backlight and the grating formed to be uniform, so as to mitigate or avoid a problem of non-uniform colors. The second sub-pixels in the liquid crystal display panel 100 do not include a color filter, thus the light transmissivity of the liquid crystal display panel 100 in the three-dimensional display device can be increased, which reduces power consumption and improves display brightness. Moreover, it is further benefit for compatible display of landscape and portrait.

Further, for example, as shown in FIG. 6, in the electroluminescent display panel 200, first sub-pixels of every two adjacent columns constitute a pixel group. Light emitting colors of first sub-pixels in a same pixel group are the same and the light emitting colors are different from light emitting colors of first sub-pixels in an adjacent pixel group. The second sub-pixels of the liquid crystal display panel 100 do not include a color filter. Then, light emitting areas and black areas that are arranged alternately in the row direction and in strip shapes in the column direction can be formed in the electroluminescent display panel in each frame of display time. Since the second sub-pixels in the liquid crystal display panel 100 do not include a color filter, the light transmissivity of the liquid crystal display panel 100 in the three-dimensional display device can be increased, which reduces power consumption and improves display brightness.

Further, each first sub-pixel in the electroluminescent display panel 200 can comprise a passive matrix organic light emitting diode (PMOLED), which enables a manufacturing process of the electroluminescent display panel to be relatively simple. Certainly, an active matrix organic light emitting diode (AMOLED) can also be used, which will not be defined here.

Further, an aspect ratio of each first sub-pixel in the electroluminescent display panel can be 1:1 or 1:2. Certainly, other aspect ratios can also be used, which will not be defined here.

Embodiments of the present disclosure provide a three-dimensional display device and a driving method thereof. A sum of every two adjacent frames of display time is not greater than a maximum time during which the human eyes can't distinguish between the one frame and the next frame. In a previous frame of display time, one part of the second sub-pixels in the liquid crystal display panel are controlled to display the left eye view, and the other part of the second sub-pixels display the right eye view. Due to blocking of a plurality of black areas in the electroluminescent display panel that are arranged at intervals with a plurality of light emitting areas at least in the row direction, the left eye of a person can only see half information of the display view in the liquid crystal display panel, and the right eye of the person can only see the other half information of the display view in the liquid crystal display panel. In a next frame of display time, the positions of the light emitting areas and the black areas in the electroluminescent display panel are controlled to be interchanged, and the left eye view and the right eye view displayed by the second sub-pixels of the two parts in the liquid crystal display panel are controlled to be switched. The second sub-pixels that display the left eye view in the previous frame display the right eye view in the next frame, and the second sub-pixels that display the right eye view in the previous frame display the left eye view in the next frame, thereby under blocking of the plurality of black areas at new positions in the electroluminescent display panel, the left eye of the person sees half information of the display view at a position different from the previous position in the liquid crystal display panel, and the right eye of the person sees the other half information of the display view at a position different from the previous position in the liquid crystal display panel. Since the sum of the previous frame and the next frame of display time is less than a maximum time during which the human eyes can't distinguish between the one frame and the next frame, the viewer can perceive an image with all information via analysis and integration by the brain, thereby increasing the resolution and the PPI of 3D display.

Apparently, the skilled person in the art can make various modifications and variations to embodiments of the present disclosure without departing from the spirit and the scope of the present disclosure. In this way, provided that these modifications and variations to embodiments of the present disclosure fall within scopes of claims of the present disclosure and equivalent technologies thereof, the present disclosure also intends to encompass these modifications and variations.

The invention claimed is:

1. A driving method of a three-dimensional display device, wherein the three-dimensional display device comprises a liquid crystal display panel and an electroluminescent display panel arranged under the liquid crystal display panel, the electroluminescent display panel comprises a plurality of first sub-pixels arranged in array, and the liquid crystal display panel comprises a plurality of second sub-pixels arranged in array, the driving method comprises:

in one frame of display time, controlling the plurality of first sub-pixels in the electroluminescent display panel to form light emitting areas and black areas arranged alternately at least in a row direction, and wherein, at least every two second sub-pixels in the liquid crystal display panel correspond to one light emitting area, in a three-dimensional display mode, the second sub-pixels corresponding to a same light emitting area are used for displaying a left eye view and a right eye view respectively;

in a next frame of display time adjacent to said one frame of display time, interchanging positions of the light emitting areas and the black areas in the electroluminescent display panel, and, controlling the second sub-pixel in the liquid crystal display panel for displaying the left eye view in said one frame of display time to display the right eye view in said next frame of display time and controlling the second sub-pixel in the liquid crystal display panel for displaying the right eye view in said one frame of display time to display the left eye view in said next frame of display time, wherein, in the three-dimensional display mode, the second sub-pixel for displaying the left eye view and the second sub-pixel for displaying the right eye view that correspond to the same light emitting area display different gray scale information, and wherein a sum of said one frame of display time and said next frame of display time is not greater than a predetermined maximum time, wherein, in a two-dimensional display mode, the second sub-pixel for displaying the left eye view and the second sub-pixel for displaying the right eye view that correspond to the same light emitting area are controlled to display the same gray scale information.

2. The driving method as claimed in claim 1, wherein the sum of said one frame of display time and said next frame of display time is 1/60 s.

3. The driving method as claimed in claim 1, further comprising: controlling the light emitting areas and the black areas arranged alternately at least in the row direction formed by the plurality of first sub-pixels in the electroluminescent display panel to be also arranged alternately in a column direction.

4. The driving method as claimed in claim 3, wherein light emitting colors of first sub-pixels of a same row in the electroluminescent display panel are the same and said light emitting colors are different from light emitting colors of first sub-pixels of an adjacent row, and wherein controlling the plurality of first sub-pixels in the electroluminescent display panel to form light emitting areas and black areas arranged alternately in the row direction and in the column direction comprises:

controlling first sub-pixels in a same row and first sub-pixels in a same column in the electroluminescent display panel to emit light alternately, so as to form light emitting areas and black areas arranged alternately in the row direction and in the column direction.

5. The driving method as claimed in claim 1, wherein the light emitting areas and the black areas formed by the plurality of first sub-pixels in the electroluminescent display panel are in strip shapes in a column direction.

6. The driving method as claimed in claim 5, wherein, in the electroluminescent display panel, first sub-pixels of every two adjacent columns constitute a pixel group, light emitting colors of first sub-pixels in a same pixel group are the same and said light emitting colors are different from light emitting colors of first sub-pixels in an adjacent pixel group, and wherein controlling the plurality of first sub-pixels in the electroluminescent display panel to form light emitting areas and black areas that are arranged alternately in the row direction and in strip shapes in the column direction comprises:

controlling a plurality of columns of first sub-pixels in the electroluminescent display panel to emit light alternately, so as to form light emitting areas and black areas that are arranged alternately in the row direction and in strip shapes in the column direction.

7. The driving method as claimed in claim 1, wherein the sum of said one frame of display time and said next frame of display time is 1/60 s.

8. The driving method as claimed in claim 1, further comprising:

controlling the light emitting areas and the black areas arranged alternately at least in the row direction formed by the plurality of first sub-pixels in the electroluminescent display panel to be also arranged alternately in a column direction.

9. The driving method as claimed in claim 8, wherein light emitting colors of first sub-pixels of a same row in the electroluminescent display panel are the same and said light emitting colors are different from light emitting colors of first sub-pixels of an adjacent row, and wherein controlling the plurality of first sub-pixels in the electroluminescent display panel to form light emitting areas and black areas arranged alternately in the row direction and in the column direction comprises:

controlling first sub-pixels in a same row and first sub-pixels in a same column in the electroluminescent display panel to emit light alternately, so as to form light emitting areas and black areas arranged alternately in the row direction and in the column direction.

10. The driving method as claimed in claim 1, wherein the light emitting areas and the black areas formed by the plurality of first sub-pixels in the electroluminescent display panel are in strip shapes in a column direction.

11. The driving method as claimed in claim 10, wherein, in the electroluminescent display panel, first sub-pixels of every two adjacent columns constitute a pixel group, light emitting colors of first sub-pixels in a same pixel group are the same and said light emitting colors are different from light emitting colors of first sub-pixels in an adjacent pixel group, and wherein controlling the plurality of first sub-pixels in the electroluminescent display panel to form light emitting areas and black areas that are arranged alternately in the row direction and in strip shapes in the column direction comprises:

controlling a plurality of columns of first sub-pixels in the electroluminescent display panel to emit light alternately, so as to form light emitting areas and black areas that are arranged alternately in the row direction and in strip shapes in the column direction.

12. A three-dimensional display device, comprising: a liquid crystal display panel and an electroluminescent display panel arranged under the liquid crystal display panel, wherein the electroluminescent display panel comprises a plurality of first sub-pixels arranged in array, in one frame of display time, the plurality of first sub-pixels in the electroluminescent display panel form light emitting areas and black areas arranged alternately at least in a row direction, and, in a next frame of display time adjacent to said one frame of display time, positions of the light emitting areas and the black areas in the electroluminescent display panel are interchanged, wherein the liquid crystal display panel comprises a plurality of second sub-pixels arranged in array, in said one frame of display time, at least every two second sub-pixels in the liquid crystal display panel correspond to one light emitting area, in a three-dimensional display mode, second sub-pixels corresponding to a same light emitting area are used for displaying a left eye view and a right eye view respectively, and, in the next frame of display time adjacent to said one frame of display time, the second sub-pixel in the liquid crystal display panel for displaying the left eye view in said one frame of display time is used for displaying the right eye view in said next frame of display time, and the second sub-pixel in the liquid crystal display panel for displaying the right eye view in said one frame of display time is used for displaying the left eye view in said next frame of display time, wherein, in the three-dimensional display mode, the second sub-pixel for displaying the left eye view and the second sub-pixel for display the right eye view that correspond to the same light emitting area display different gray scale information, wherein a sum of said one frame of display time and said next frame of display time is not greater than a predetermined maximum time, and wherein, in a two-dimensional display mode, the second sub-pixel for displaying the left eye view and the second sub-pixel for displaying the right eye view that correspond to the same light emitting area display the same gray scale information.

13. The three-dimensional display device as claimed in claim 12, wherein light emitting colors of first sub-pixels of a same row in the electroluminescent display panel are the same and said light emitting colors are different from light emitting colors of first sub-pixels of an adjacent row, and the second sub-pixels of the liquid crystal display panel do not include a color filter.

14. The three-dimensional display device as claimed in claim 13, wherein each first sub-pixel in the electroluminescent display panel comprises a passive matrix organic light emitting diode (PMOLED).

15. The three-dimensional display device as claimed in claim 14, wherein an aspect ratio of each first sub-pixel is 1:1 or 1:2.

16. The three-dimensional display device as claimed in claim 12, wherein, in the electroluminescent display panel, first sub-pixels of every two adjacent columns constitute a pixel group, light emitting colors of first sub-pixels in a same pixel group are the same and said light emitting colors are different from light emitting colors of first sub-pixels in an adjacent pixel group, and the second sub-pixels of the liquid crystal display panel do not include a color filter.

17. The three-dimensional display device as claimed in claim 16, wherein each first sub-pixel in the electroluminescent display panel comprises a passive matrix organic light emitting diode (PMOLED).

18. The three-dimensional display device as claimed in claim 17, wherein an aspect ratio of each first sub-pixel is 1:1 or 1:2.

* * * * *